United States Patent [19]
Ervin et al.

[11] 3,911,982
[45] Oct. 14, 1975

[54] CABLE LOGGING SYSTEM AND OPERATING METHOD

[76] Inventors: Evander M. Ervin; Ervin E. Dargan, both of c/o Roundwood Corporation of America, P.O. Box 826, Florence, S.C. 29501

[22] Filed: May 28, 1974

[21] Appl. No.: 473,807

[52] U.S. Cl............. 144/309 AC; 144/3 D; 212/71; 254/147
[51] Int. Cl.².. B27M 1/08; B27C 9/00; E27C 29/16
[58] Field of Search .......... 254/147; 212/71, 72, 73; 144/2 Z, 3 D, 34 R, 34 E, 309 AC

[56] References Cited
UNITED STATES PATENTS
| | | | |
|---|---|---|---|
| 3,083,839 | 4/1963 | McIntyre | 212/71 |
| 3,356,116 | 12/1967 | Brundell et al. | 144/309 AC |
| 3,386,704 | 6/1968 | Dawson | 254/147 X |
| 3,460,594 | 8/1969 | Burkhalter | 144/309 AC X |

*Primary Examiner*—Donald R. Schran
*Assistant Examiner*—W. D. Bray
*Attorney, Agent, or Firm*—Richards, Shefte & Pinckney

[57] ABSTRACT

A cable logging system is provided that operates at ground level and is arranged for working progressively from a base station to allow effective yarding of trees or logs as they are harvested. The system is designed for operation at particular advantage in swampland.

10 Claims, 6 Drawing Figures

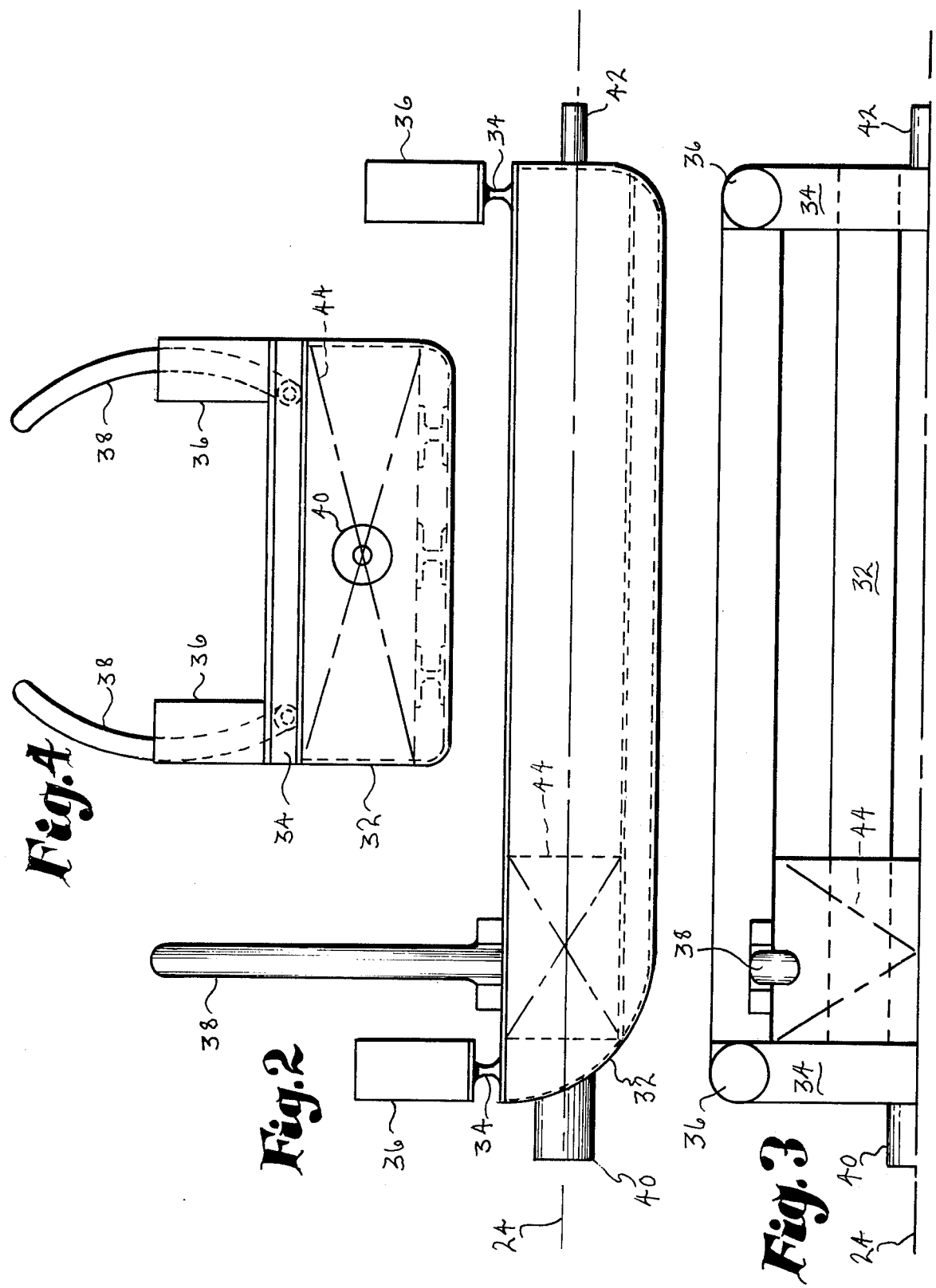

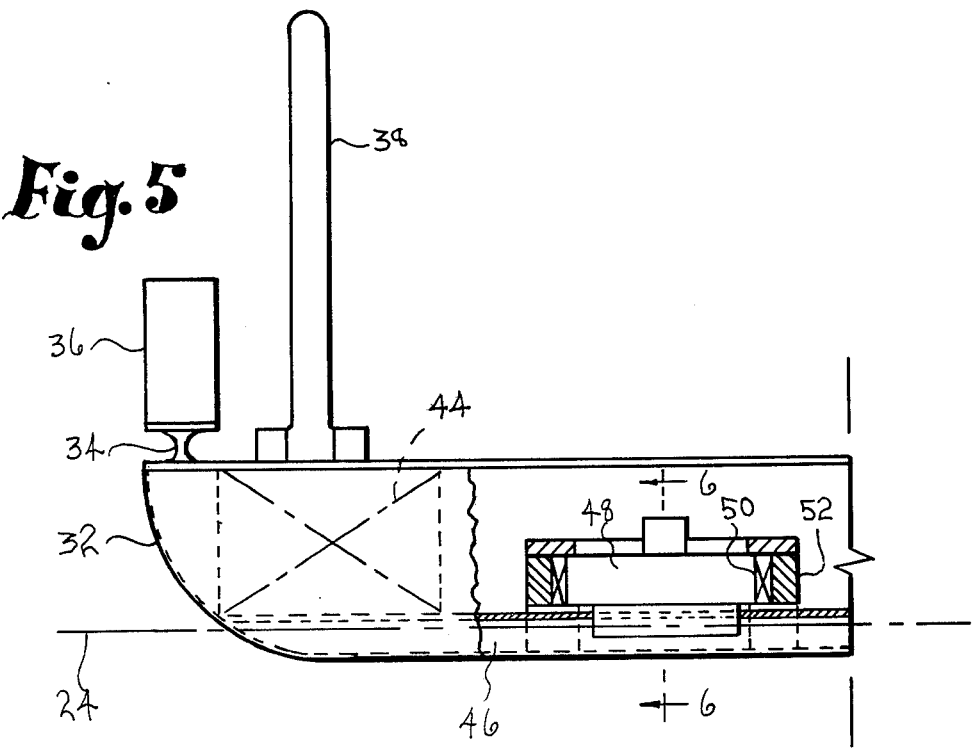
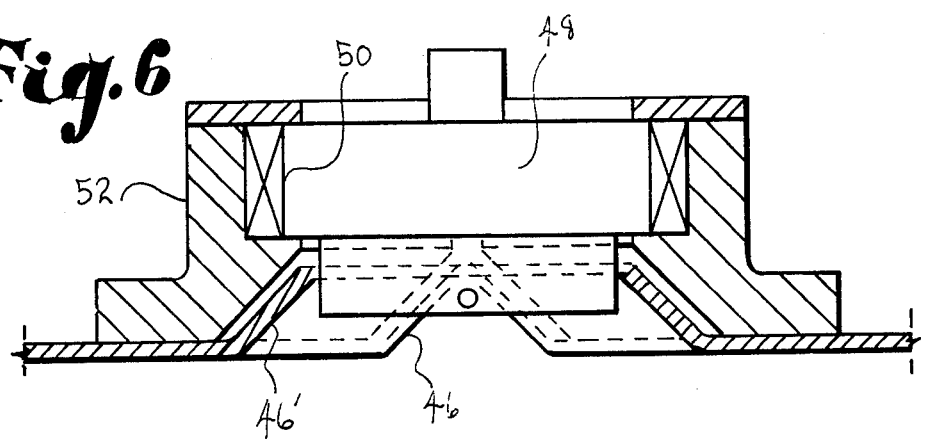

CABLE LOGGING SYSTEM AND OPERATING METHOD

BACKGROUND OF THE INVENTION

Cable logging systems normally depend on changes of elevation in the area to be harvested for successful operation. Where ground contour does not provide sufficient change in elevation at the harvesting site, a yarding tower and outlying spars have been used to supply the lack, but in any event a so-called "running skyline" must be rigged for effective operation of cable logging systems of the sort heretofore employed.

In swampland, however, slope in the terrain is virtually non-existent, while effective anchoring of yarding towers and related spars is quite difficult, so that cable logging has not lent itself readily to swampland operation even though the yarding capability it provides would be highly desirable in dealing with many swamp forest conditions. The present invention provides a cable logging system operating at ground level that eliminates the difficulties heretofore encountered with such systems in swampland and that makes it possible to recover swamp timber advantageously where it had not previously been practical or as efficient as it should be.

SUMMARY OF THE INVENTION

Generally characterized, the cable logging system of the present invention includes a self-propelled fore vehicle, a base station, a felled tree drag unit, cable extending from the base station to the fore vehicle with the drag unit associated intermediately therewith, and means for loading the drag unit with felled trees. The drag unit is fitted for grasping a load of trees thereon so as to hold them securely for skidding, and is also equipped for gripping or remaining loose on the cable, while the base station is arranged for paying out and drawing in the cable as the fore vehicle moves away from or returns toward the base station and as a drag unit is to be moved to the fore vehicle for loading or brought to the base station when loaded.

Use of this system involves establishing the base station at a suitable yarding point, moving the fore vehicle to a tree harvesting zone while maintaining the cable extended from the base station to the fore vehicle, securing a load of felled trees on a drag unit positioned adjacent the fore vehicle, causing the drag unit to grip the cable and drawing the same in at the base station to deliver the tree load thereat, and then paying out the cable to return the drag unit to the fore vehicle for repeated loading thereat.

DESCRIPTION OF THE DRAWINGS

FIG. 2 is a side elevation of a drag unit such as is employed in the FIG. 1 embodiment;

FIG. 3 is a partial plan view corresponding to FIG. 2;

FIG. 4 is an end elevation as seen from the left in FIG. 2;

FIG. 5 is a partial side elevation corresponding to FIG. 2, but showing a modified cable associating arrangement; and FIG. 6 is a sectional detail taken substantially at the line 6—6 in FIG. 5.

DETAILED DESCRIPTION OF THE INVENTION

Figure 1:
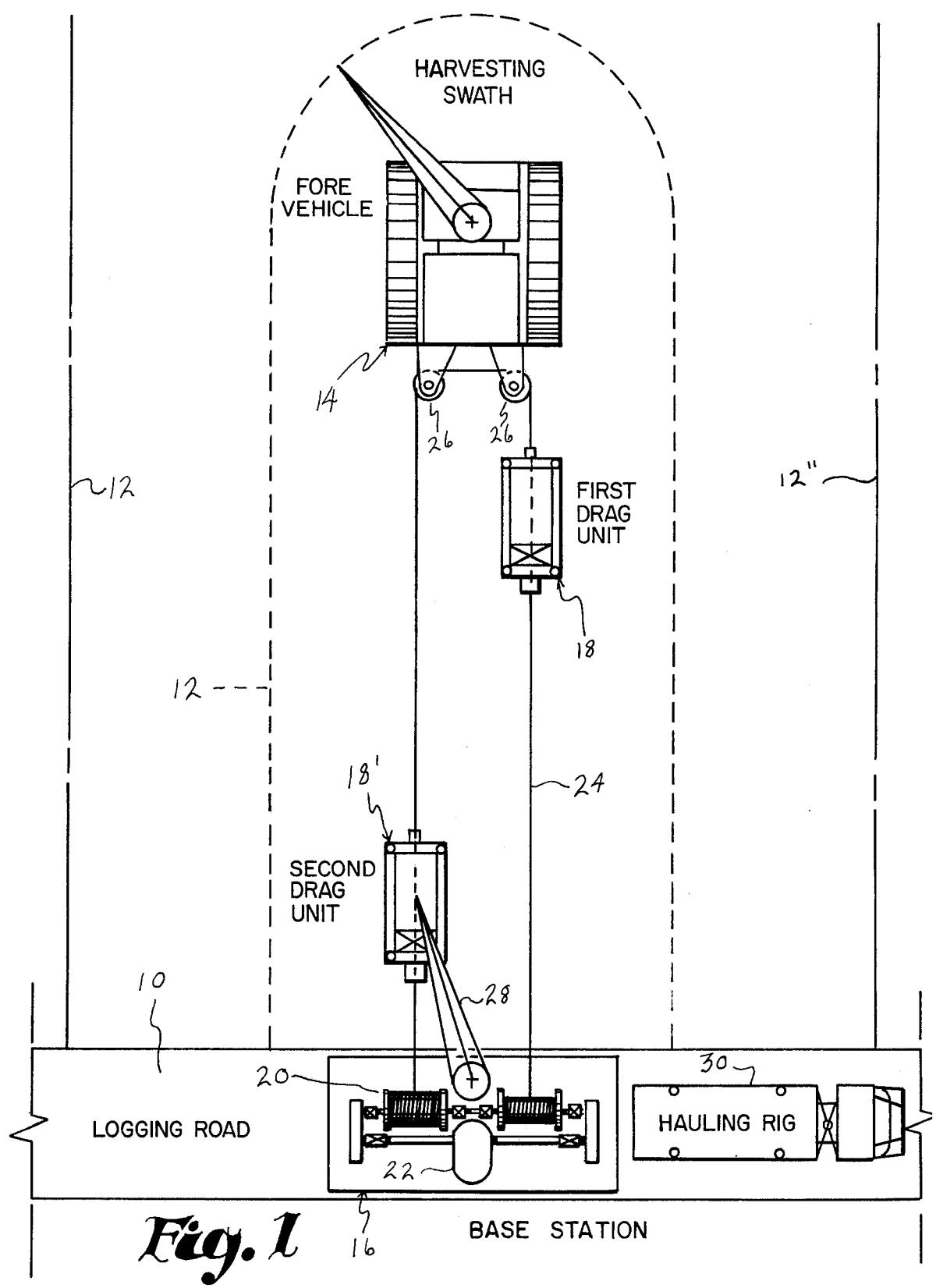
FIG. 1 is a schematic diagram of a representation embodiment of the cable logging system of the present invention.

As diagramed in FIG. 1, the cable logging system of the present invention is employed to best advantage in swampland situations, or otherwise, from a logging road constructed across the area to be harvested. From such a road the logging system can be readily arranged to reach up to a mile off each side of the road and to harvest a swath about 50 feet wide at each such reach. Accordingly, by locating the logging road suitably for coverage of the area involved, and parallelly spacing additional roads if required by the size of the area, effective swampland logging can be carried out with relative ease and very substantially improved efficiency where it would ordinarily be extremely difficult and costly.

The system can also be operated from a swampland water base under appropriate circumstances, although the coverage afforded by such operation is necessarily restricted by the natural location of whatever water course is available and a logging road base offers much greater advantage in this respect. In addition, the system is equally well adapted for dry land operation or relatively level ground.

The logging system of the present invention is additionally notable in that it allows harvested logs to be recovered substantially free of mud and like fouling such as is normally encountered under swampland conditions, which is a significant advantage when the recovered logs are to be used for pulpwood clipping. Also, the recovery is effected in a manner that minimizes environmental damage in the harvested area, as will appear further below in describing the system operation.

Referring more particularly to the FIG. 1 diagram, a logging road is indicated at 10 extending across the base of a harvesting swath such as is marked off by the dotted outline at 12, with the center lines of similar harvesting swaths at each side being indicated at 12' and 12''. Each harvesting swath 12 is cut by a self-propelled tree harvester which may be, and preferably is, the fore vehicle 14 of the system, in which case it should have tree handling as well as tree cutting capability of the general sort disclosed in U.S. Pat. No. 3,720,245. For swampland use, the harvester 14 should be mounted on an off-the-road carrier, preferably of the caterpillar type, and be capable of operation in at least 4 feet of water. The tree cutting capability of harvester 14 may be provided by a shear mechanism or by chain saw means or by an auger type cutter, the latter type usually being preferable for use in swampland because it lends itself more readily to provision of the capacity needed for cutting the swelled butts commonly encountered in swamps.

The tree harvester 14, as the fore vehicle of the logging system operates in relation to a base station 16 and at least one felled tree drag unit 18 which is advantageously paired with a second such unit 18' in most instances. The base station 16 is arranged to best advantage in trailer mounted form so that it can be moved along the logging road 10 for positioning at each harvesting site and braced suitably at each such site for operation. In the illustrated embodiment, a double-drum winch 20 is carried by the base station 16 for operation by a power unit 22 to provide for extending cable 24 therefrom in a loop to the fore vehicle 14 with the drag units 18 and 18' respectively associated with each reach of the looped cable.

The looped form in which cable 24 extends from base station 16 is maintained by training the extended about a pair of spaced sheaves 26 carried by fore vehicle 14 for this purpose. In order to facilitate whatever maneuvering of fore vehicle 14 is necessary, the sheave pair 26 should be pivotally carried thereat, as by a singletree connection (not shown). Alternatively, the system can be operated with a single reach of cable 24 extended between base station 16 and fore vehicle 14, in which case only a single-drum winch would be needed at the base station 16 and similar winch capacity would be required at the fore vehicle 14. Such as arrangement would make it easier to extend the range of fore vehicle 14 from the base station 16, but it would eliminate the possibility and attendant advantage of employing a pair of drag units 18 and 18′ which will usually be desirable.

Operation of the illustrated logging system arrangement proceeds as follows. First, the base station 16 is moved into position and established in securely braced condition at the base of the harvesting swath to be cut and the tree harvester 14 is moved into the tree harvesting zone as a mobile forward station with the looped cable 24 extending thereto from base station 16 and the drag units 18 and 18′ intermediately associated with the respective cable reaches. In order to allow tree harvester 14 to move into the harvesting zone the gearing (not shown) at power unit 22 is set to allow both drums of the base station winch 20 to pay out cable as required by such movement.

Also, as is described further below, each of the drag units 18 and 18′ is equipped with means for selectively rendering them fast or loose on cable 24, and this means is employed to position one of the drag units, such as 18 in FIG. 1, adjacent the tree harvester 14 during its tree cutting operation. This may be done either by causing drag unit 18 to grip cable 24 or the tree harvester 14 moves away from base station 16 so that this unit will be carried out at the same time, or the gearing at power unit 22 can be used to cause the related drum of base station winch 20 to pay out cable 24 with the drag unit 18 fast thereon, while the other winch drum draws in cable. In either case the other drag unit 18′ is maintained loose on cable 24 so as to remain at base station 16 until subsequently needed.

With the system initially deployed in such an arrangement, the tree harvester 14 is operated to cut and load trees on the adjacent drag unit 18 which is also equipped with means, as also noted further below, for securing the loaded trees thereon for movement into base station 16. Accordingly, as soon as drag unit 18 is fully loaded it is made fast again on cable 24 and base station winch 20 is operated to draw in the related cable reach while paying out the other reach with the other drag unit 18′ fast thereon this time so as to be moved into position adjacent harvester 14 in place of unit 18 for similar loading with felled trees during unloading of drag unit 18 at base station 16. For such unloading, the base station 16 is additionally fitted with a conventional loader boom 28 equipped with a suitable log grapple by which the recovered drag unit load can be transferred to a hauling rig, as indicated at 30 in FIG. 1, to be carried off for delivery to a point of storage or use. Alternate loading and unloading of the drag units 18 and 18′ is similarly repeated until the harvesting of the swath 12 being cut has been completed.

Initial deployment of the logging system for operation in the foregoing manner, and redeployment of the same from site to site, is accomplished by delivering the fore vehicle 14 and drag units 18 and 18′ to the harvesting site on over-the-road trailers along with the trailer mounted base station 16. As delivered, the base station 16 will have the cable 24 fully drawn in thereat with a suitable joint provided therein between the fully wound winch drums which can be opened to allow association of the drag units 18 and 18′ with a cable reach from each winch drum before installing the cable in looped form at the fore vehicle sheaver 26. The drag units 18 and 18′ can be put in place for such association by the loader boom 28 carried by the base station 16, while the off-the-road capability of the self-propelled fore vehicle 14 will allow it to be moved into related position for installation of the cable loop thereat. Once the harvesting has been completed from one base site, both drag units 18 and 18′ are drawn in adjacent the base station 16 and the fore vehicle 14 is brought in to allow disengagement and full retraction of cable 24, so that the equipment can be moved by trailer to the next site for redeployment. As up to 6 acres can be harvested off one side of logging road 10 from each base site the set up requirements at each site are entirely reasonably and practical.

A suitable form of drag unit 18 (or 18′) for swampland use is illustrated in FIG. 2, 3 and 4 as having the form of a ground sled which includes a lower ground engaging portion 32 and superimposed transverse bolsters 34 at each end for supporting a felled tree load thereon. The bolsters 34 have posts 36 attached at each end to provide lateral support for a tree load placed thereon and grapple arms 38 are installed adjacent the forward bolsters 34 for grasping the tree load so as to secure the tree load on the drag unit for skidding. A good size for the drag units is about 18 feet in length and about 8 feet in width with a load carrying capacity of about 5 to 6 thousand pounds allowing it to skid something like 10 to 30 cut trees or logs at a time depending on the size of the timber being cut. Additionally, the drag unit ground engaging portion 32 should be proportioned in height so that the bolsters 34 thereon are carried at a sufficient elevation, suitably about 28 inches, to maintain all but a minimal end portion of a tree load clear of the ground during skidding and thereby minimize fouling of the load with mud or the like as previously mentioned.

The drag unit ground engaging portion 32 is also arranged to have the cable 24 extended lengthwise therethrough for associating the drag unit 18 (or 18′) intermediately therewith between the fore vehicle 14 and base station 16. For this purpose, forward and rear cable guides 40 and 42 are fitted at the ground engaging portion 32 to allow threading of the cable 24 axially therethrough, and the forward cable guide 40 is specially provided with cable clamping capability by which the drag unit can be selectively rendered fast or loose on the cable. Any conventional cable clamping mechanism can be provided at the forward guide 40, although it should be hydraulically operated for best service under the intended swampland conditions of use, and hydraulic operation of the grapple arms 38 should be provided for as well. For such operation of both the forward guide clamping mechanism at 40 and the grapple arms 38, an actuating and control unit, as indicated at 44, is arranged in the drag unit lower portion, and is equipped for remote monitoring by radio signal from either the fore vehicle 14 or the base station 16 or both.

The drag unit arrangement illustrated in FIGS. 2, 3 and 4 is intended primarily for use when the harvested trees are to be topped, because this form of drag unit will normally remain aligned with the reaches of cable 24 as diagrammed in FIG. 1 and the tree harvester 14 will accordingly be able to load the cut trees only with the butts thereof trailing from the drag unit, which means that the treetops must be removed to avoid undue interference with drag unit travel as the tree load is brought in to the base station. Topping of the trees can be accomplished either by using the tree harvester 14 for this purpose before each tree is cut and loaded or, if the harvester 14 cannot reach high enough for suitable topping of the trees involved, treetopping shears can be mounted at the forward end of the drag unit for additional operation by the actuating and control unit 44. In the latter case the topped tree portions will fall away in a manner tending to form a bed in the path of travel of the drag units and thereby serve the purpose of facilitating such travel, while in the former case the tree toppings will tend to form a matting in the path of the harvester 14 and thereby improve its footing.

If whole tree harvesting is desired, it would be possible to employ the boom of the tree harvester to shift each drag unit when it was brought into position for loading from its normal alignment with cable 24 to an angular relation allowing the cut trees to be loaded with the blossom end trailing from the drag unit, but such shifting of the drag unit embodiment shown in FIGS. 2, 3 and 4 would require pulling slack in the related cable reach which is likely to be difficult and could cause cable damage, so that a better drag unit arrangement for this purpose is illustrated in FIGS. 5 and 6. In this modified embodiment of FIGS. 5 and 6, the drag unit 18 (or 18') has the same sled-like form including a lower ground engaging portion 32 supporting superimposed transverse bolsters 34 fitted with attached posts 36, and also carrying grapple arms 38 as well as being equipped with an actuating and control unit 44, all in correspondence with the previously described embodiment. The difference in the embodiment of FIGS. 5 and 6 is in the provision for association with cable 24 by means of inverted V-shaped channel 46 formed centrally at the bottom of each drag unit 18 (or 18') and running from front to back thereof with a circular enlargement 46' arranged intermediate its length to accommodate a swiveled cable clamping mechanism 48 through which the cable 24 is threaded, and which again should be hydraulically operated. The clamping mechanism 48 is mounted for swiveling at a bearing 50 carried in a bracket structure 52 secured at the drag unit bottom concentrically with respect to the cable channel enlargement 46'. The channel enlargement 46', and consequent positioning of clamping mechanism 48, is spaced closest to the front of drag unit 18 (or 18').

By virtue of this modified arrangement an angled relation for whole tree loading of the drag units can be established simply by swiveling them about the clamping mechanism, as the cable 24 is released freely by the cable channel 46 upon such swiveling and a swiveled drag unit will assume a transverse relation to the cable reach thereat without requiring any cable slack or disturbing the cable materially. When the drag unit 18 (or 18') has been loaded and is ready to be brought into the base station 16, the winch operation pull on the cable reach thereat will cause the loaded drag unit to straighten out because of the spacing of clamping mechanisms 48 toward the drag unit front, and as a consequence cable 24 will find an aligned position within the cable channel 46 so that the yarding operation will proceed just as in the case of the previously described embodiment.

A cable logging system of the sort provided by the present invention can be effectively operated by a three-man crew; one man operating the fore vehicle 14, one man operating the base station 16, and the third man for relief duty and general supporting assistance. Radio communication between the fore vehicle and base station operations can be provided to allow them to coordinate their activities efficiently and to function from their respective stations with very substantially less exposure to the disagreeable conditions that normally characterize swampland logging. In addition, drag units such as are described above for use in operating the system make it possible to recover the harvested timber by skidding without appreciable cutting of the harvested area and consequently with minimal environmental damage. For dry land operation a wheeled version of the drag unit can be used with equally good results, and it should be noted that the components of the system are subject to some variation either in swamps or on dry land, as by employing a loader as fore vehicle 14 to load the drag units 18 and 18' after a tree harvester had advanced freely to cut the trees in preparation for loading. However, the logging system arrangement illustrated and described is believed best adapted for realizing the advantages of the invention particularly in swampland.

The present invention has been described in detail above for purposes of illustration only and is not intended to be limited by this description or otherwise to exclude any variation or equivalent arrangement that would be apparent from, or reasonably suggested by, the foregoing disclosures to the skill of the art.

We claim:

1. A cable logging system comprising a self-propelled fore vehicle, a base station, a felled tree drag unit, cable extending from said base station to said fore vehicle with said drag unit associated intermediately therewith, means operable at said force vehicle for loading said drag unit with felled trees, first means carried by said drag unit for grasping trees loaded thereon, second means carried by said drag unit for selectively rendering the same fast or loose on said cable, and means for paying out and drawing in said cable as said fore vehicle moves away from or returns toward said base station and as a drag unit is to be moved to said fore vehicle for loading or brought to said base station when loaded.

2. A cable logging system as defined in claim 1 wherein said fore vehicle is fitted with tree harvesting means.

3. A cable logging system as defined in claim 1 wherein said drag unit has the form of a ground sled and is equipped with a grapple forming said tree grasping means.

4. A cable logging system as defined in claim 3 wherein the ground sled forming said drag unit includes a lower ground engaging portion and superimposed transverse bolsters for supporting a felled tree load at a sufficient elevation to maintain all but a minimal end portion of said load clear of the ground.

5. A cable logging system as defined in claim 4 wherein the lower ground engaging portion of said drag unit is arranged to have said cable extended lengthwise therethrough for associating said drag unit intermediately with said cable, and a clamping mechanism is provided at said lower portion in relation to said cable to form said means for selectively rendering said drag unit fast or loose on said cable.

6. A cable logging system as defined in claim 5 wherein the bottom of said drag unit is formed lengthwise with an inverted V-shaped channel for extension of said cable therethrough, and said clamping mechanism is swiveled for allowing angular shifting of said drag unit with respect to said cable.

7. A cable logging system as defined in claim 1 wherein said cable extends in a loop from said base station to said fore vehicle and a drag unit is associated intermediately with each reach of the looped cable.

8. A cable logging method comprising the steps of establishing a base station, moving a mobile forward station to a tree harvesting zone while maintaining a cable extended between said base and forward stations, securing a group of felled trees on a ground based support adjacent said forward station, causing said support to grip said cable, drawing in said cable at said base station to deliver said tree group thereat, and paying out said cable to return and support to said forward station.

9. A cable logging method as defined in claim 8 wherein said mobile forward station is operated to harvest trees and load the same on said ground based support.

10. A cable logging method as defined in claim 8 wherein said group of felled trees is secured on said support so as to maintain all but a minimal end portion thereof clear of the ground during delivery to said base station.

* * * * *

UNITED STATES PATENT OFFICE
CERTIFICATE OF CORRECTION

Patent No. 3,911,982                Dated October 14, 1975

Inventor(s) Evander M. Ervin et al

It is certified that error appears in the above-identified patent and that said Letters Patent are hereby corrected as shown below:

Column 3, line 12, delete "as" and insert therefor --an--;

Column 6, line 45, delete "force" and insert therefor --fore--;

Column 8, line 8, delete "and" and insert therefor --said--.

Signed and Sealed this tenth Day of February 1976

[SEAL]

Attest:

RUTH C. MASON
Attesting Officer

C. MARSHALL DANN
Commissioner of Patents and Trademarks